United States Patent [19]

Goto

[11] Patent Number: 5,410,659
[45] Date of Patent: Apr. 25, 1995

[54] DIGITAL PROCESSOR WITH INSTRUCTION MEMORY OF REDUCED STORAGE SIZE

[75] Inventor: Junichi Goto, Tokyo, Japan

[73] Assignee: NEC Corporation, Tokyo, Japan

[21] Appl. No.: 47,579

[22] Filed: Apr. 13, 1993

[30] Foreign Application Priority Data

Apr. 13, 1992 [JP] Japan .................................. 4-091308

[51] Int. Cl.⁶ .............................................. G06F 9/30
[52] U.S. Cl. .................................................... 395/375
[58] Field of Search ........................ 395/375, 500, 775

[56] References Cited

U.S. PATENT DOCUMENTS

| | | | |
|---|---|---|---|
| 3,812,464 | 5/1974 | Collina et al. | 395/375 |
| 4,763,246 | 8/1988 | Holt et al. | 395/375 |
| 4,835,679 | 5/1989 | Kida et al. | 395/375 |
| 4,890,218 | 12/1989 | Braun | 395/375 |
| 5,045,995 | 9/1991 | Levinthal et al. | 395/375 |
| 5,101,483 | 3/1992 | Tanagawa | 395/375 |
| 5,233,675 | 8/1993 | Miyoshi | 395/375 |

OTHER PUBLICATIONS

Patterson et al. "Computer Architecture-A Quantitative Approach" (1990) p. 208.

Primary Examiner—Parshotam S. Lall
Assistant Examiner—Viet Vu

[57] ABSTRACT

A digital processor has a data processing unit having arithmetic/logic operation circuits, an instruction memory for storing an instruction word, and an instruction decoder for decoding the instruction word read from the instruction memory and outputting the control signals respectively to the arithmetic/logic operation circuits. Each instruction word has at least a first control field and a second control field. The instruction decoder has two decoding circuits. Each of the decoding circuits corresponds to each group of the arithmetic/logic operation circuits, receives the instruction word for decoding the second control field into a control signal and outputs an ENABLE signal. The ENABLE signal from the first decoding circuit is applied to the second decoding circuit, and the ENABLE signal from the second decoding circuit is applied to the first decoding circuit. Only one of the first and second decoding circuits outputs a control signal at a time.

7 Claims, 3 Drawing Sheets

DIGITAL PROCESSOR WITH INSTRUCTION MEMORY OF REDUCED STORAGE SIZE

BACKGROUND OF THE INVENTION

1. Field of the Invention

The present invention relates to a digital processor such as a microprocessor, a digital signal processor (DSP) or the like, and more particularly to a digital processor controlled by a microprogram.

2. Description of the Related Art

Digital processors having a plurality of processing circuits, a plurality of memory blocks, and a plurality of data buses for improved performance have recently been proposed and put to use. Such a digital processor comprises a data processing unit for carrying out arithmetic and logic operations and an instruction unit for controlling operation of processing circuits of the data processing unit, the data processing unit and the instruction unit being functionally separate from each other. The digital processor is described in detail in "COMPUTER ARCHITECTURE—A QUANTITATIVE APPROACH" written by David A. Patterson and John L. Hennessy, published by Morgan Kauhmann Publishers, Inc., page 208 (1990), for example.

FIG. 1A of the accompanying drawings shows an arrangement of a digital processing unit with a data processing unit having a plurality of internal data buses and a plurality of processing circuits. The digital processor has an instruction unit 51a for outputting a group of control signals S54 and a data processing unit 52 for carrying out the data processing operations in accordance with the control signals S54. The control signals S54 include control signals S54A, S54B, S54C (described later on).

The data processing unit 52 will first be described in detail. The data processing unit 52 comprises two data buses BUS0, BUS1 and two processing circuits including an arithmetic/logic unit (ALU) 52a and a multiplier 52b. The arithmetic/logic unit 52a and the multiplier 52b are controlled by the control signals S54A, S54B, respectively. Each of control signals S54A, S54B has a length of 5 bits. Each of the arithmetic/logic unit 52a and the multiplier 52b is connected to the data buses BUS0, BUS1, so that data D0, D1 on the data buses BUS0, BUS1 are supplied to both the arithmetic/logic unit 52a and the multiplier 52b. The arithmetic/logic unit 52a and the multiplier 52b can usually effectively operate exclusively of each other.

The instruction unit 51a has an instruction memory 53a and an instruction decoder 54a. The instruction memory 53a stores a plurality of instruction words for controlling operation of the data processing unit 52 and branching in an execution sequence. Depending on the operation to be carried out by the digital processor, a certain instruction word selected from the stored instruction words is supplied from the instruction memory 53a as an instruction signal S53a to the instruction decoder 54a.

The structure of instruction words will be described below with reference to FIG. 1B. The instruction signal S53a, i.e., each instruction word, has a length of 13 bits. The instruction word comprises two control fields A, B each having a length of 5 bits and a control field C having a length of 3 bits. The data represented by the control field A corresponds to the control signal S54A supplied to the ALU 52a, the data represented by the control field B to the control signal S54B supplied to the multiplier 52b, and the data represented by the control field C to the control signal S54C having a length of 3 bits which is used to control branching in an execution sequence. The instruction word is divided into the control signals S54A, S54B, S54C by the instruction decoder 54a. The control signal S54A is supplied to the ALU 52a, the control signal S54B to the multiplier 52b, and the control signal S54C to a circuit (not shown) for branching control.

As described above, either one of the ALU 52a and the multiplier 52b usually effectively operates exclusively of each other. Therefore, either one of the control fields A, B of each instruction word is not used for the storage of data. Such a condition is indicated by control fields that are represented by "—" in instruction words 59 stored in the instruction memory 53a as shown in FIG. 1A.

The conventional digital processor described above has problems in that the instruction memory for storing instruction words requires a large storage capacity to meet multifunction requirements and hence the large storage capacity of the instruction memory results in an increase in the cost of the digital processor.

SUMMARY OF THE INVENTION

It is an object of the present invention to provide a digital processor having an instruction memory of relatively small storage capacity in an instruction unit.

According to the present invention, the above object can be achieved by a digital processor comprising data processing means for processing data, the data processing means having a plurality of arithmetic/logic operation means controllable by control signals, instruction memory means for storing an instruction word comprising at least a first control field and a second control field, and instruction decoding means for decoding the instruction word read from the instruction memory means and outputting the control signals respectively to the arithmetic/logic operation means, the instruction decoding means comprising first decoding means having an ENABLE signal input terminal, receiving the instruction word for decoding the second control field into a control signal for the arithmetic/logic operation means in one group, and generating a first ENABLE signal, and second decoding means having an ENABLE signal input terminal, receiving the instruction word for decoding the second control field into a control signal for the arithmetic/logic operation means in another group, and generating a second ENABLE signal, the arrangement being such that the first ENABLE signal is applied to the ENABLE signal input terminal of the second decoding means, the second ENABLE signal is applied to the ENABLE signal input terminal of the first decoding means, and only one of the first and second decoding means outputs the control signal at a time.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1A:
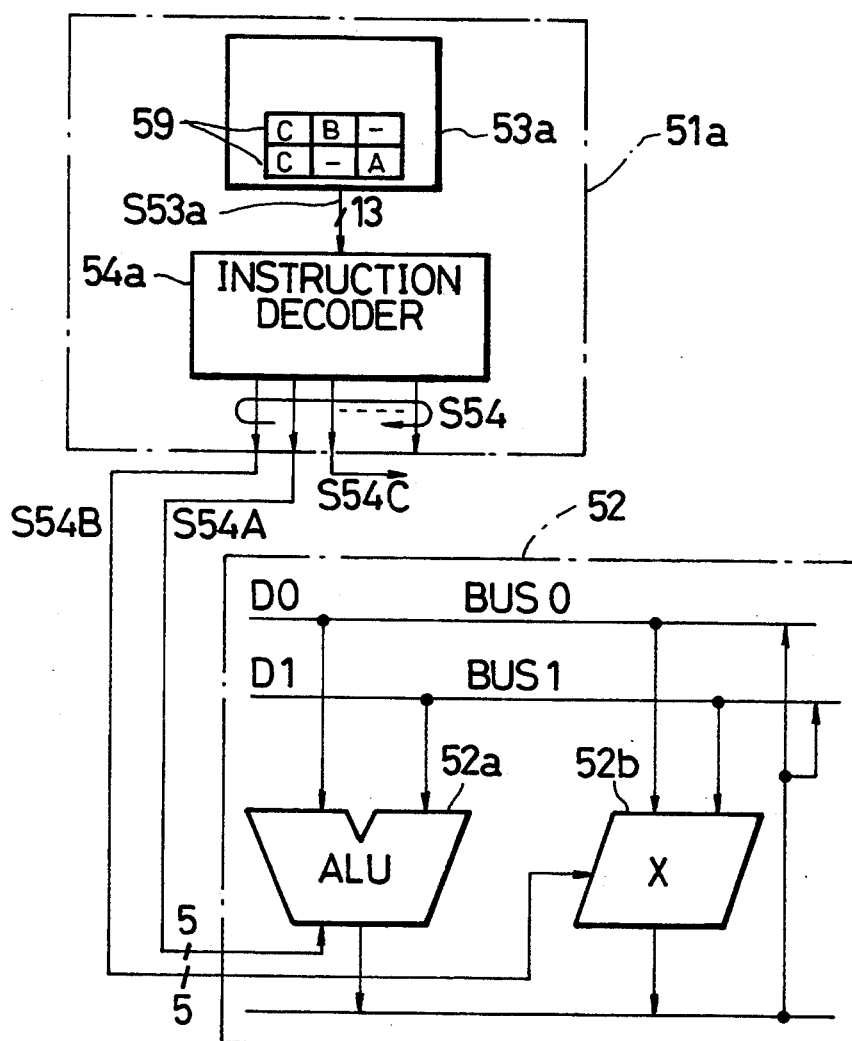
FIG. 1A is a block diagram of a conventional digital processor with an instruction unit and a data processing unit.
Figure 2A:
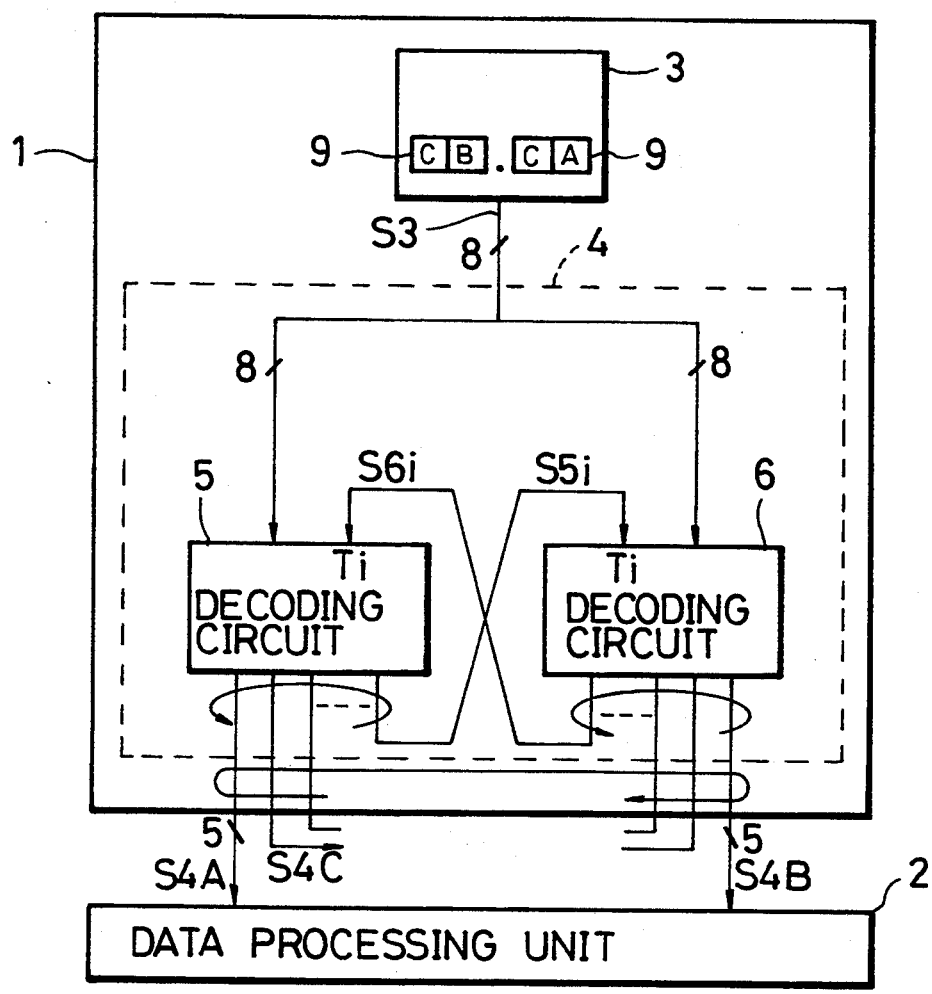
FIG. 2A is a block diagram of a digital processor according to a preferred embodiment of the present invention, showing an instruction unit in detail.

As shown in FIG. 2A, a digital processor according to the preferred embodiment of the present invention comprises an instruction unit 1 and a data processing unit 2. As with the conventional digital processor shown in FIG. 1A, the data processor 2 has two processing circuits that are controlled by respective control signals S4A, S4B each having a length of 5 bits.

The instruction unit 1 comprises an instruction memory 3 and an instruction decoder 4. The instruction memory 3 serves to store instruction words which can each be outputted as an instruction word readout signal S3 having a length of 8 bits. The Instruction word readout signal S3 is supplied to the instruction decoder 4, which decodes the instruction word readout signal S3 into three control signals S4A, S4B, S4C. As described above, each of the control signals S4A, S4B is of 5 bits and applied to the data processing unit 2. The control signal S4C, which has a length of 3 bits, is used to control branching in an execution sequence of operation of the digital processor. The control signal S4C is supplied to a circuit (not shown) for branching control.

Figure 2B:
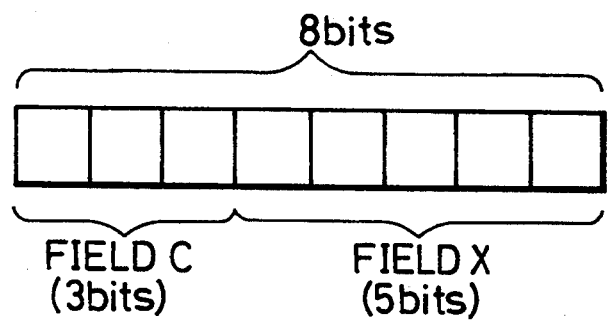
FIG. 2B is a diagram illustrating the structure of an instruction word used in the digital processor shown in FIG. 2A.

The instruction words used by the digital processor of the present embodiment will be described below. As shown in FIG. 2B, each of the instruction words has a length of 8 bits and comprises a combination of a branching control field C having a length of 3 bits and a common control field X having a length of 5 bits. The data of the branching control field C corresponds to the control sign S4C. The common control field X is used commonly for the generation of the control signals S4A, S4B. Therefore, the data of the common control field X corresponds to the control signal S4A at one time, and also corresponds to the control signal S4B at another time. In FIG. 2A, the instruction memory 3 is shown as storing two instruction words 9 by way of example. One of the instruction words 9 comprises control fields C, B, indicating that the instruction word 9 causes the control signal S4B to be outputted. The other instruction word 9 comprises control fields C, A, indicating that the instruction word 9 causes the control signal S4A to be outputted.

In this embodiment, the control field corresponding to both the control signals S4A, S4B is used in common on the condition that the two processing circuits in the data processing unit 2 do not effectively operate simultaneously. Therefore, the instruction decoder 4 must be capable of recognizing which of the control signals S4A, S4B is represented by the data of the common control field X, and of outputting a control signal based on the recognized information. The instruction decoder 4 will be described in detail below.

The instruction decoder 4 comprises two decoding circuits 5, 6 for generating the control signals S4A, S4B, respectively. The first decoding circuit 5 is supplied with the instruction word readout signal S3 and a second ENABLE signal S6i produced by the second decoding circuit 6, and produces the control signals S4A, S4C and a first ENABLE signal S5i. Likewise, the second decoding circuit 6 is supplied with the instruction word readout signal S3 and the first ENABLE signal S5i produced by the first decoding circuit 5, and produces the control signals S4B, S4C and the second ENABLE signal S6i. The ENABLE signals S6i, S5i are applied respectively to ENABLE signal input terminals Ti of the first and second decoding circuits 5, 6.

Figure 2C:
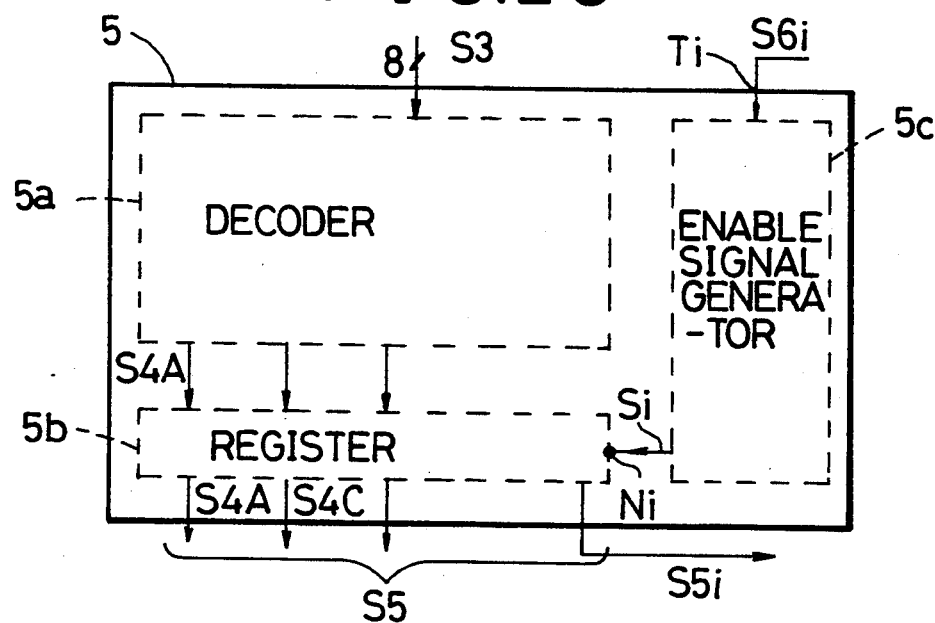
FIG. 2C is a block diagram of a decoding circuit in the instruction unit shown in FIG. 2A.

The first and second decoding circuits 5, 6 are of an identical structure. Therefore, only the first decoding circuit 5 will be described below with reference to FIG. 2C.

The decoding circuit 5 comprises a decoder 5a for being supplied with the instruction word readout signal S3, a register 5b for outputting the control signals S4A, S4C and the first ENABLE signal S5i, and an ENABLE signal generator 5c connected to the ENABLE signal input terminal Ti for being supplied with the second ENABLE signal S6i.

When the second ENABLE signal S6i is active, the ENABLE signal generator 5c supplies an internal ENABLE signal Si to the register 5b. When the second ENABLE signal S6i is not active, then the internal ENABLE signal Si is inactive.

The decoder 5a decodes the instruction word readout signal S3 and outputs the control signals S4C, S4A corresponding respectively to the branching control field C and the common control field X to the register 5b. At this time, even when the data of the common control field X of the supplied instruction word readout signal S3 corresponds to the control signal S4B, the decoder 5a outputs the control signals as if the data of the common control field X corresponds to the control signal S4A.

The register 5b has an ENABLE node Ni supplied with the internal ENABLE signal Si from the ENABLE signal generator 5c. When the internal ENABLE signal Si is active, the register 5b outputs the control signals S4A, S4C from the decoder 5a and renders the first ENABLE signal S5i inactive. When the internal ENABLE signal Si is inactive, the register 5b does not output the control signals S4A, S4C and renders the first ENABLE signal S5i active. However, the register 5b makes the first ENABLE signal S5i inactive if the control signal S4A and/or the control signal S4C is of a certain bit pattern and also the internal ENABLE signal Si is inactive.

Figure 3:
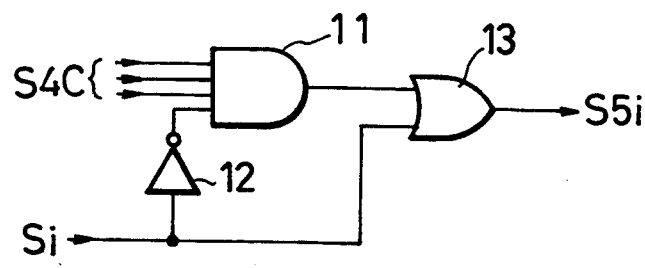
FIG. 3 is a block diagram of a circuit for generating an ENABLE signal.

For example, if all the bits of the 3-bit control signal S4C are of "1" and also the internal ENABLE signal Si is inactive, then the register 5b outputs the first ENABLE signal S5i. FIG. 3 shows a circuit for generating the first ENABLE signal S5i. The circuit shown in FIG. 3 has an AND gate 11, an inverter 12, and an OR gate 13. The internal ENABLE signal Si is applied to both the inverter 12 and the OR gate 13, and all the bits of the control signal S4C and an output signal from the inverter gate 12 are applied to the AND gate 11. The OR gate 13 is also supplied with an output signal from the AND gate 11, and produces its output signal as the first ENABLE signal S5i.

The register 5b may comprise a known gate buffer for controlling the output of the control signals S4A, S4B depending on the internal ENABLE signal S1.

Operation of the digital processor will be described below. It is assumed that immediately after the digital processor is reset, i.e., starts operating, the first decoding circuit 5 is effective in decoding instructions, i.e., the first ENABLE signal S5i is inactive and the second ENABLE signal S6i is active.

The instruction word readout signal S3 is supplied from the instruction memory 3 to the first and second decoding circuits 5, 6. However, since the first ENABLE signal S5i is inactive and the second ENABLE signal S6i is active, only the first decoding circuit 5 outputs the control signals S4A, S4C, and the second decoding circuit 6 outputs no control signals.

When an instruction word readout signal indicating that the second decoding circuit 6 is to be effective is supplied to the instruction decoder 4, the supplied instruction word readout signal is transmitted to the decoding circuits 5, 6. Inasmuch as the first ENABLE signal S5i is inactive, the second ENABLE signal S6i outputted from the second decoding circuit 6 is rendered inactive by the supplied instruction word readout signal. With the second ENABLE signal S6i rendered inactive, the first ENABLE signal S5i outputted from the first decoding circuit 5 is rendered active. As a result, the first decoding circuit 5 becomes ineffective in decoding instructions, and at the same time, the second decoding circuit 6 becomes effective in decoding instructions. This condition continues until the instruction decoder 4 is supplied with an instruction word readout signal indicating that the first decoding circuit 5 is to be effective.

For example, if the first ENABLE signal S5i applied to the ENABLE signal input terminal Ti of the second decoding circuit 6 is rendered active when all the bits of the 3-bit branching control field C are of "1", then the second decoding circuit 6 becomes effective to decode instructions, and the first decoding circuit 5 becomes ineffective to decode instructions. The second decoding circuit 6 remains effective to decode instructions until the second ENABLE signal S6i is supplied to the first decoding circuit 5. That is, while all the bits of the 3-bit branching control field C are of "1", the first and second decoding circuits 5, 6 are selectively rendered effective and ineffective. Thus the two processing circuits in the data processing unit 2 are switched alternately into operation.

Figure 1B:
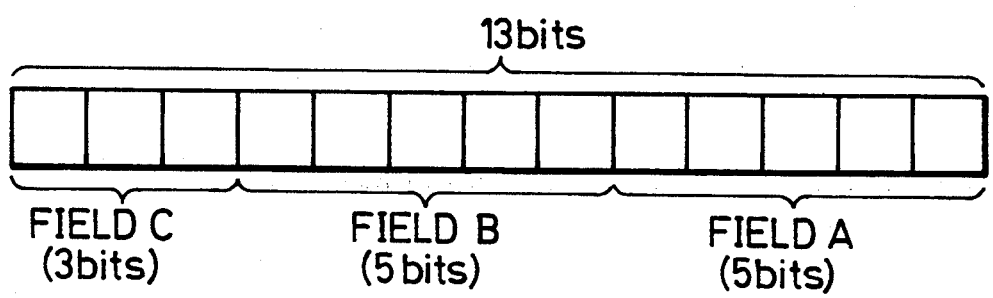
FIG. 1B is a diagram illustrating the structure of an instruction word used in the conventional digital processor shown in FIG. 1A.

Now, comparison between the digital processor of this embodiment and the conventional digital processor shown in FIGS. 1A and 1B will be described below. The digital processor of the present embodiment and the conventional digital processor are similar to each other in that the data processing unit has two processing circuits, each controlled by a 5-bit control signal, and a 3-bit branching control signal is employed.

The conventional digital processor uses 13-bit instruction words, whereas the digital processor of the present embodiment uses 8-bit instruction words for the same control. Accordingly, the storage capacity of the instruction memory of the digital processor of this embodiment may be smaller than that of the conventional digital processor by 5 bits × types of instruction words. Depending on the architecture of the digital processor, it is possible for the digital processor to assign two instructions to the same bit pattern of instruction words, and the bit length of instruction words can be equivalently doubled. Thus, the bit length of unit instruction words stored in the instruction memory and the storage capacity of the instruction memory may be reduced substantially to half.

The decoding capacity of the decoders in the decoding circuits 5, 6 according to the present embodiment may be about half the decoding capacity of the instruction decoder in the conventional digital processor.

In the above illustrated embodiment, the ENABLE signal generator may be dispensed with, and the ENABLE signal may be supplied directly to the register in the decoding circuit. The ENABLE signal generator may be composed of desired logic gates for generating the internal ENABLE signal only when a certain logic condition is satisfied.

Although a certain preferred embodiment of the present invention has been shown and described in detail, it should be understood that various changes and modifications may be made therein without departing from the scope of the appended claims.

What is claimed is:

1. A digital processor comprising:

data processing means for processing data;

said data processing means having a plurality of arithmetic/logic operation means controllable by control signals;

instruction memory means for storing an instruction word comprising at least a first control field and a second control field; and instruction decoding means for decoding said instruction word read from said instruction memory means and outputting said control signals respectively to said arithmetic/logic operation means;

said instruction decoding means comprising:

first decoding means having an ENABLE signal input terminal, receiving said instruction word for decoding said second control field into a control signal for the arithmetic/logic operation means in one group, and generating a first ENABLE signal; and second decoding means having an ENABLE signal input terminal, receiving said instruction word for decoding said second control field into a control signal for the arithmetic/logic operation means in another group, and generating a second ENABLE signal;

said first and second decoding means being arranged in parallel to each other between said instruction memory means and said data processing means such that said first ENABLE signal is applied to said ENABLE signal input terminal of said second decoding means, said second ENABLE signal is applied to said ENABLE signal input terminal of said first decoding means, and only one of said first and second decoding means outputs a control signal for said arithmetic/logic operation means in a corresponding one of said one group and said another group at a time, and wherein each of said first and second decoding means comprises means for outputting the control signal to the corresponding group of said arithmetic/logic operation means and rendering a respective ENABLE signal outputted therefrom inactive when a respective ENABLE signal applied thereto is active, rendering the respective ENABLE signal outputted therefrom inactive when said first control field is of a predetermined bit pattern and the respective ENABLE signal applied thereto is inactive, and failing to output the control signal to the corresponding group of said arithmetic/logic operation means and rendering the respective EN-ABLE signal generated thereby active when said first control field is not of a predetermined bit pattern and the respective ENABLE signal applied thereto is inactive.

2. A digital processor according to claim 1, wherein each of said first and second decoding means comprises means for decoding said first control field into a control signal for other than said arithmetic/logic operation means.

3. A digital processor according to claim 1, wherein there are two arithmetic/logic operation means corresponding respectively to said first and second decoding means.

4. A digital processor according to claim 1, wherein each of said first and second decoding means comprises a decoding block for receiving said instruction word and outputting said control signal based on said instruction word, and a register connected to an output terminal of said decoding block such that said register can be turned on and off by the respective ENABLE signal applied thereto.

5. A digital processor according to claim 1, wherein said instruction memory means comprises means for storing a plurality of instruction words.

6. A digital processor according to claim 4, wherein each of said first and second decoding means comprises an ENABLE signal generator connected between said ENABLE signal input terminal and said register, said ENABLE signal generator comprising a logic gate circuit.

7. A digital processor according to claim 5, wherein said first control field has a bit length larger than the bit length of said second control field.

* * * * *